(12) United States Patent
Bramnick et al.

(10) Patent No.: US 10,181,103 B2
(45) Date of Patent: Jan. 15, 2019

(54) ROUTING PREFERRED TRAFFIC WITHIN A RESERVATION SYSTEM

(71) Applicant: International Business Machines Corporation, Armonk, NY (US)

(72) Inventors: Arnold H. Bramnick, Boca Raton, FL (US); Peter L. Lutz, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 730 days.

(21) Appl. No.: 13/785,368

(22) Filed: Mar. 5, 2013

(65) Prior Publication Data

US 2014/0257878 A1    Sep. 11, 2014

(51) Int. Cl.
*G06Q 10/00*    (2012.01)
*G06Q 10/02*    (2012.01)

(52) U.S. Cl.
CPC .................................. *G06Q 10/02* (2013.01)

(58) Field of Classification Search
CPC ........ G06Q 10/02; G06Q 30/00; G06Q 50/14; G06Q 30/0601; G06Q 50/12; G06F 17/30864; G06F 17/30554; H04L 43/0852; H04L 43/16
See application file for complete search history.

(56) References Cited

U.S. PATENT DOCUMENTS

| | | | |
|---|---|---|---|
| 4,546,450 A * | 10/1985 | Kanuma | G06F 13/37 710/244 |
| 7,191,244 B2 | 3/2007 | Jennings et al. | |
| 7,617,136 B1 | 11/2009 | Lessing et al. | |
| 7,693,991 B2 | 4/2010 | Greenlee et al. | |
| 8,103,774 B2 | 1/2012 | Betzler et al. | |
| 8,176,177 B2 | 5/2012 | Sussman et al. | |
| 2002/0062236 A1 | 5/2002 | Murashita et al. | |
| 2006/0020684 A1* | 1/2006 | Mukherjee | H04L 67/06 709/219 |
| 2007/0118653 A1* | 5/2007 | Bindal | 709/226 |
| 2008/0027948 A1 | 1/2008 | Corley et al. | |
| 2012/0084165 A1 | 4/2012 | Hirose et al. | |
| 2013/0103854 A1 | 4/2013 | Garrett et al. | |
| 2013/0215733 A1 | 8/2013 | Jiang et al. | |

OTHER PUBLICATIONS

Liebmann, L. (2000). Load balancing: Where the action is. Network Magazine, NA. Retrieved from https://dialog.proquest.com/professional/professional/docview/670956870?accountid=142257.*

* cited by examiner

*Primary Examiner* — Michael Harrington
(74) *Attorney, Agent, or Firm* — Maeve M. Carpenter

(57) ABSTRACT

A method for managing inbound user traffic to a reservation system. The method includes receiving messages from one or more users and determining, by one or more computer processors, at least one of the one or more users is not a preferred user, based on the messages received. The method further includes sending the messages from the at least one user to a limiting component, wherein the limiting component slows the messages from the at least one of the one or more users to the reservation system.

18 Claims, 4 Drawing Sheets

ROUTING PREFERRED TRAFFIC WITHIN A RESERVATION SYSTEM

FIELD OF THE INVENTION

The present invention relates generally to the field of computerized reservation systems, and more particularly to routing preferred traffic within a reservation system.

BACKGROUND OF THE INVENTION

Frequently reservations, including travel reservations, tickets for events, and even restaurant reservations, are made through computerized reservation systems. In particular, travel reservations make up one of the largest components of internet commerce. Travel websites may include travel reviews and suggestions, or only allow users to book travel, or offer a combination of both. Individual airlines, hotels, cruise lines, and other travel-related service providers often maintain their own websites providing information and retail sales. Often, sites with a combination of provided services include some sort of search engine to allow users to search for bookings within a timeframe, service class, geographic location or price range. Many computerized reservation systems deal with increasing message rates from users that are only looking, and rarely booking reservations. Users that are only searching degrade the overall system performance, impacting users that may actually book reservations.

SUMMARY

Embodiments of the present invention disclose a method, computer program product, and computer system for managing inbound user traffic to a reservation system. The method includes receiving messages from one or more users and determining, by one or more computer processors, at least one of the one or more users is not a preferred user, based on the messages received from the at least one user. The method further includes sending the messages from the at least one user to a limiting component, wherein the limiting component slows the messages from the at least one of the one or more users to the reservation system.

DETAILED DESCRIPTION

Figure 1:
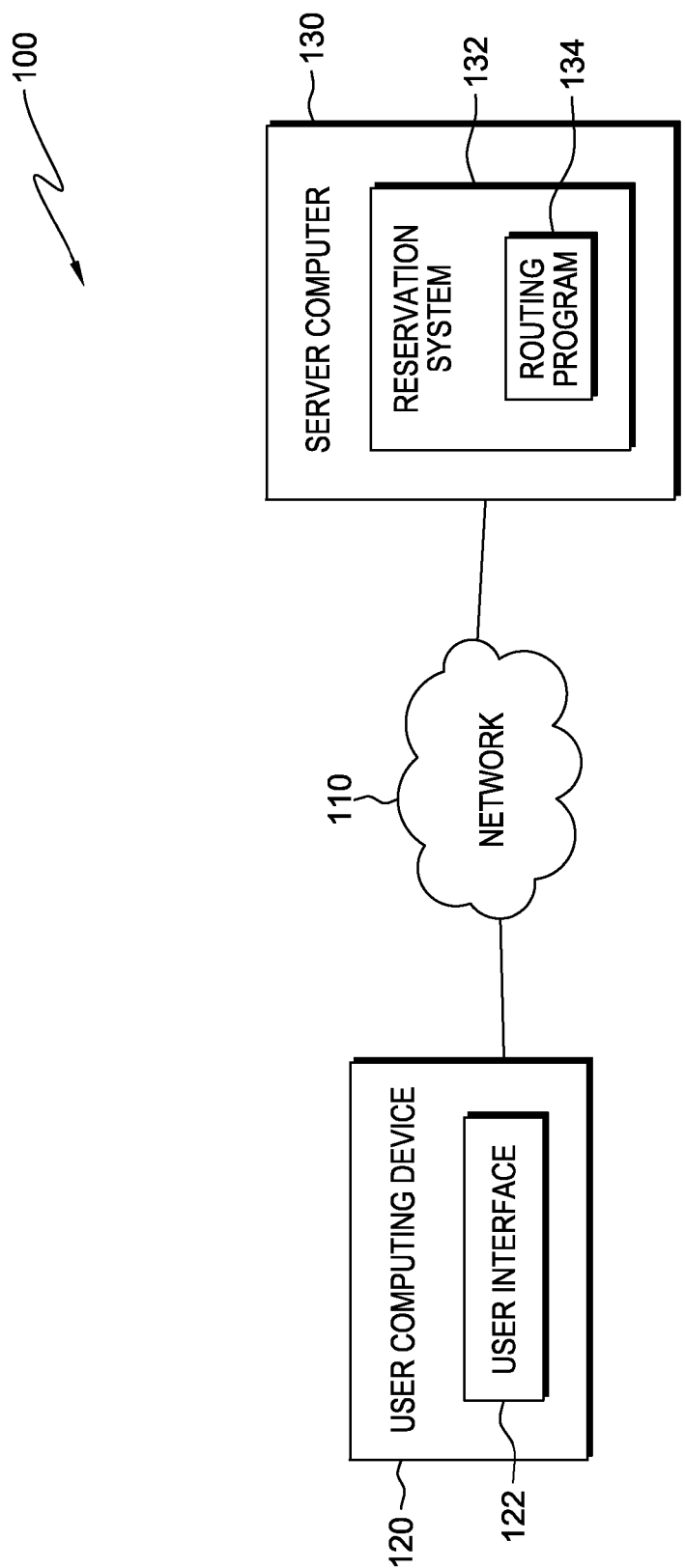
FIG. 1 is a functional block diagram illustrating a reservation processing environment, in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 is a functional block diagram illustrating a reservation processing environment, generally designated 100, in accordance with an embodiment of the present invention. Reservation processing environment 100 includes user computing device 120 and server computer 130, all interconnected over network 110.

Network 110 can be, for example, a local area network (LAN), a wide area network (WAN) such as the Internet, or a combination of the two, and can include wired, wireless, or fiber optic connections. In general, network 110 can be any combination of connections and protocols that will support communications between user computing device 120 and server computer 130.

User computing device 120 includes user interface (UI) 122. In various embodiments of the present invention, user computing device 120 can be a laptop computer, tablet computer, netbook computer, personal computer (PC), a desktop computer, a personal digital assistant (PDA), a smart phone, or any programmable electronic device capable of communicating with server computer 130 via network 110. A user of user computing device 120 may be an individual, a group of individuals or a company within reservation processing environment 100 accessing a reservation system, for example, reservation system 132 on server computer 130, through network 110. UI 122 may be, for example, a graphical user interface (GUI) or a web user interface (WUI) and can display text, documents, web browser windows, and options or instructions for accessing and using reservation system 132, for example, searching, viewing and selecting reservations.

Server computer 130 includes reservation system 132 and routing program 134. Server computer 130 can be a laptop computer, tablet computer, netbook computer, PC, a desktop computer, a PDA, a smart phone or any programmable electronic device capable of communicating with user computing device 120 via network 110 and with various components and devices within reservation processing environment 100. In an exemplary embodiment of the present invention, server computer 130 represents a computing system utilizing clustered computers and components to act as a single pool of seamless resources when accessed through a network, such as network 110. Server computer 130 may include internal and external hardware components, as depicted and described in further detail with respect to FIG. 4.

In an exemplary embodiment of the present invention, reservation system 132 is a travel reservation system that allows users to search for and book reservations, for example, in the airline, hotel, or cruise industry. In other various embodiments of the present invention, reservation system 132 may include any e-commerce site using a computerized system to sell goods or services to a computerized shopper. Routing program 134 analyzes inbound user traffic to reservation system 132 and determines preferred users, who are then routed directly to the reservation system. Preferred users may be users having a history of actual bookings in the reservation system, as opposed to users who spend time searching for and only reviewing, not booking, reservations. Users who primarily review, instead of book reservations, are routed through a limiting component, such as a slower computer processor, before being routed to the reservation system. While in FIG. 1, routing program 134 is included in server computer 130, one of skill in the art will appreciate that in other embodiments, the routing program may be located elsewhere within reservation processing environment 100 and can communicate with reservation system 132 via network 110.

Figure 2:
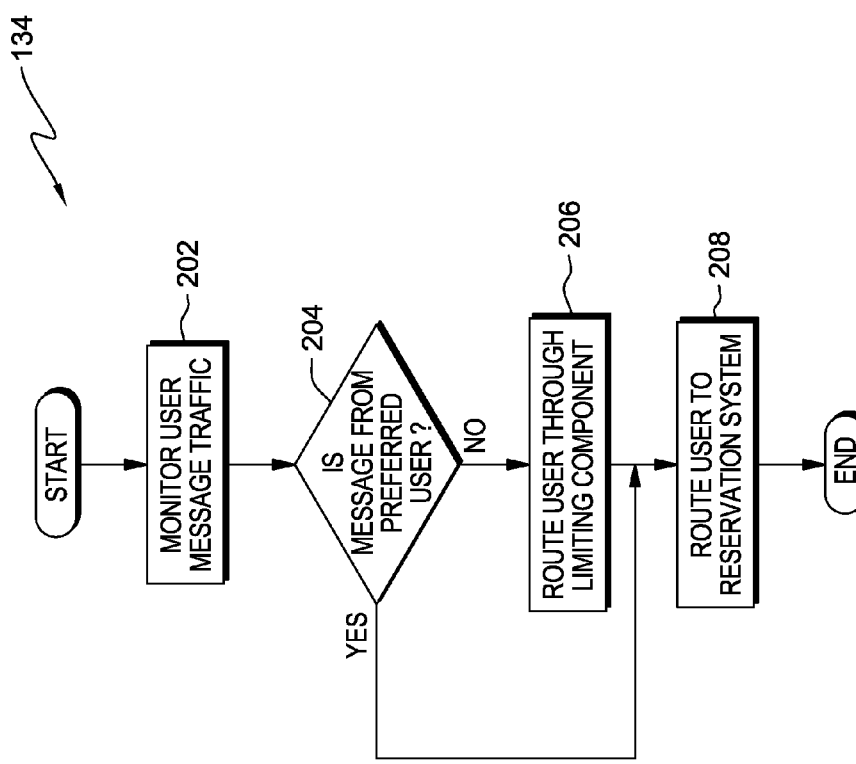
FIG. 2 is a flowchart depicting operational steps of a routing program for routing preferred traffic within a reservation processing environment, in accordance with an embodiment of the present invention.

FIG. 2 is a flowchart depicting operational steps of routing program 134 for routing preferred traffic within reservation processing environment 100, in accordance with an embodiment of the present invention.

Routing program 134 monitors user message traffic (step 202). Routing program 134 monitors user message traffic by examining each inbound message sent to reservation system 132 by individuals or companies, which may include, for example, travel agencies. An inbound message is any user message traffic accessing the reservation system, including searches and other information requests.

Routing program 134 determines whether an inbound message is from a preferred user (decision block 204). Routing program 134 uses rules and/or policies, which may be set by a reservation system owner, to determine whether a user sending messages to the reservation system is a preferred user. The rules and/or policies may look to whether message elements or message traffic by a certain user exceeds a defined threshold or meets some other parameter. For example, a rule may define a message type, such as a search parameter, and set a maximum number of messages of the message type from a single user that may be accepted within a defined time period. In this example, any user having less than the maximum number of messages over the defined time period is a preferred user. If the inbound message is from a preferred user (decision block 204, yes branch), the user is routed directly to the reservation system, for example, reservation system 132 within reservation processing environment 100, and is then able to search and book reservations as desired (step 208).

If the inbound message is not from a preferred user (decision block 204, no branch), for example, a user having more than the maximum number of messages of a defined message type in a defined time period, the user is routed through a limiting component (step 206). A limiting component can include, for example, performance limitations such as slower computer processors, or limited connection access to the reservation system. In various embodiments of the present invention, limiting components can include programmable or physical components adapted to slow down message traffic from users routing program 134 determines are not preferred users. In various embodiments, message traffic from not preferred users may be monitored, and if it improves, for example, the number of messages received over a defined time period is reduced; the user may be re-identified as a preferred user.

Routing program 134 routes the user, both the preferred and the not preferred user, to the reservation system (step 208). Routing program 134 routes all users to the reservation system, however, preferred users are routed directly to reservation system 132, and, as discussed above, not preferred users are first sent through the limiting component in order to slow access to the reservation system.

Figure 3:
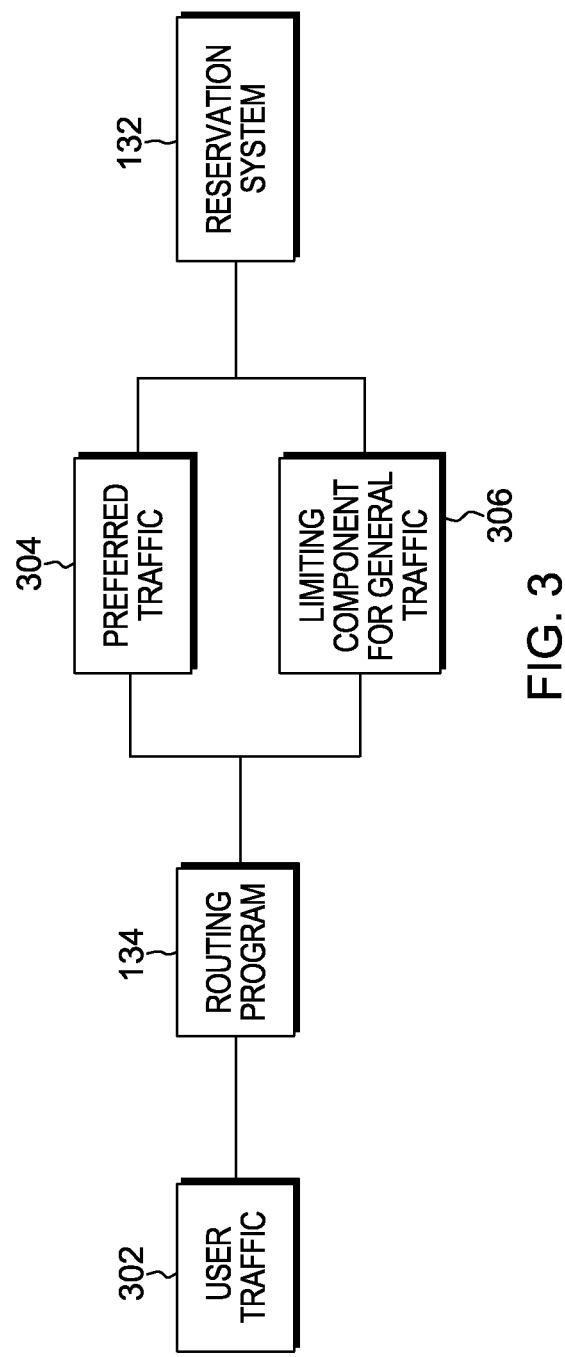
FIG. 3 depicts a flow diagram representing message traffic flow within a reservation processing environment, in accordance with an embodiment of the present invention.

FIG. 3 depicts a flow diagram representing message traffic flow routed by routing program 134 within reservation processing environment 100, in accordance with an embodiment of the present invention. Routing program 134 monitors all user traffic 302 sent to reservation system 132 within reservation processing environment 100. Preferred traffic 304 is routed directly to reservation system 132, as shown by the upper path, while other traffic, not from preferred users, is routed first to a limiting component for general traffic 306, as shown by the lower path, which slows, or limits, the general traffic access to reservation system 132.

Figure 4:
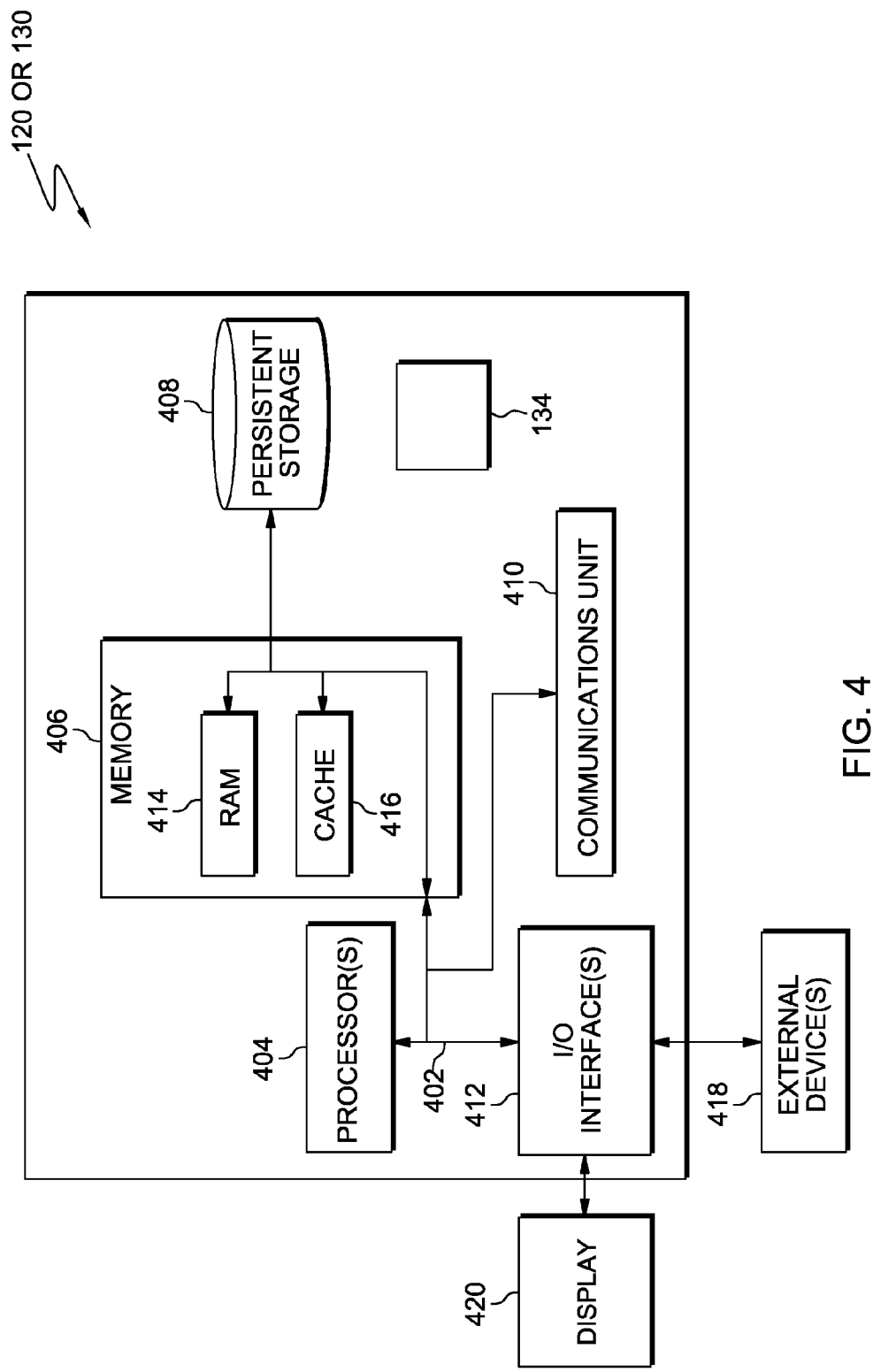
FIG. 4 depicts a block diagram of internal and external components of a data processing system, such as the user computing device or the server computer of FIG. 1, in accordance with an embodiment of the present invention.

FIG. 4 depicts a block diagram of internal and external components of a data processing system, such as user computing device 120 or server computer 130 of FIG. 1, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

User computing device 120 or server computer 130 may include communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Routing program 134 is stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including between user computing device 120 and server computer 130. In these examples, communications unit 410 includes one or more network interface cards. Communications unit 410 may provide communications through the use of either or both physical and wireless communications links. Routing program 134 may be downloaded to persistent storage 408 through communications unit 410.

I/O interface(s) 412 allows for input and output of data with other devices that may be connected to user computing device 120 or server computer 130. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., routing program 134, can be stored on such portable computer-readable storage media and can be loaded onto persistent storage 408 via I/O interface(s) 412. I/O interface(s) 412 also connect to a display 420. Display 420 provides a mechanism to display data to a user and may be, for example, a computer monitor or an incorporated display screen, such as is used in tablet computers and smart phones.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for managing inbound user traffic to a reservation system, the method comprising:
   receiving, by a first computer processor, one or more messages from one or more users;
   determining, by the first computer processors, a type of message of each of the one or more messages;
   determining, by the first computer processor, at least one user of the one or more users is not a preferred user, based on the type of message of each of the one or more messages received from the at least one user and based on a history of the at least one user of the one or more users, wherein the history includes whether the at least one user has a history of actual bookings in the reservation system or whether the at least one user searches and reviews, but does not book reservations;

sending, by the first computer processor, the one or more messages from the at least one user to a limiting component, wherein the limiting component includes at least a programmable physical computing component adapted to provide a limited number of network connections to the reservation system to slow message traffic from the at least one of the one or more users to the reservation system;

monitoring, by the first computer processor, each of the one or more messages received from the at least one user of the one or more users;

determining, by the first computer processor, whether a number of the one or more messages received from the at least one user of the one or more users is reduced over a defined time period; and responsive to determining the number of the one or more messages received is reduced over the defined time period, determining, by the first computer processor, the at least one user of the one or more users is a preferred user.

2. The method of claim 1, further comprising:

determining, by the first computer processor, at least one of the one or more users is a preferred user, based on the one or more messages received from the at least one user; and sending, by the first computer processor, the one or more messages from the preferred user directly to the reservation system.

3. The method of claim 1, wherein the limiting component in the sending step further includes a second computer processor, wherein the second computer processor processes message traffic at a slower rate than the first computer processor.

4. The method of claim 1, wherein the received one or more messages include at least one of: a search request, an information request, or a reservation selection.

5. The method of claim 1, wherein said determining at least one of the users is not a preferred user further comprises:

determining, by the first computer processor, if a number of messages received and a type of message received exceeds a predetermined threshold; and determining, by the first computer processor, based on the exceeded predetermined threshold, the at least one of the one or more users is not a preferred user.

6. The method of claim 5, wherein the predetermined threshold is defined based, at least in part, on a plurality of rules set by an owner of the reservation system, and wherein the plurality of rules includes at least a time period in which a maximum number of the type of message is received.

7. A computer program product for managing inbound user traffic to a reservation system, the computer program product comprising:

one or more computer-readable tangible storage devices and program instructions stored on the one or more computer-readable tangible storage devices, the program instructions comprising:

program instructions to receive one or more messages from one or more users;

program instructions to determine a type of message of each of the one or more messages;

program instructions to determine at least one user of the one or more users is not a preferred user, based on the type of message of each of the one or more messages received from the at least one user and based on a history of the at least one user of the one or more users, wherein the history includes whether the at least one user has a history of actual bookings in the reservation system or whether the at least one user searches and reviews, but does not book reservations;

program instructions to send the one or more messages from the at least one user to a limiting component, wherein the limiting component includes at least a programmable physical computing component adapted to provide a limited number of network connections to the reservation system to slow message traffic from the at least one of the one or more users to the reservation system;

program instructions to monitor each of the one or more messages received from the at least one user of the one or more users;

program instructions to determine whether a number of the one or more messages received from the at least one user of the one or more users is reduced over a defined time period; and responsive to determining the number of the one or more messages received is reduced over the defined time period, program instructions to determine the at least one user of the one or more users is a preferred user.

8. The computer program product of claim 7, further comprising:

program instructions to determine at least one of the one or more users is a preferred user, based on the one or more messages received from the at least one user; and program instructions to send the one or more messages from the preferred user directly to the reservation system.

9. The computer program product of claim 7, wherein the limiting component in the sending step further includes a second computer processor, wherein the second computer processor processes message traffic at a slower rate than the first computer processor.

10. The computer program product of claim 7, wherein the received one or more messages include at least one of: a search request, an information request, or a reservation selection.

11. The computer program product of claim 7, wherein program instructions to determine at least one of the users is not a preferred user further comprise:

program instructions to determine if a number of messages received and a type of message received exceeds a predetermined threshold; and program instructions to determine, based on the exceeded predetermined threshold, the at least one of the one or more users is not a preferred user.

12. The computer program product of claim 11, wherein the predetermined threshold is defined based, at least in part, on a plurality of rules set by an owner of the reservation system, and wherein the plurality of rules includes at least a time period in which a maximum number of the type of message is received.

13. A computer system for managing inbound user traffic to a reservation system, the computer system comprising:

one or more computer processors;

one or more computer-readable tangible storage media;

program instructions stored on the one or more computer-readable tangible storage media for execution by at least one of the one or more computer processors, the program instructions comprising:

program instructions to receive one or more messages from one or more users;

program instructions to determine a type of message of each of the one or more messages;

program instructions to determine at least one user of the one or more users is not a preferred user, based on the type of message of each of the one or more messages received from the at least one user and based on a history of the at least one user of the one or more users, wherein the history includes whether the at least one user has a history of actual bookings in the reservation system or whether the at least one user searches and reviews, but does not book reservations;

program instructions to send the one or more messages from the at least one user to a limiting component, wherein the limiting component includes at least a programmable physical computing component adapted to provide a limited number of network connections to the reservation system to slow message traffic from the at least one of the one or more users to the reservation system;

program instructions to monitor each of the one or more messages received from the at least one user of the one or more users;

program instructions to determine whether a number of the one or more messages received from the at least one user of the one or more users is reduced over a defined time period; and responsive to determining the number of the one or more messages received is reduced over the defined time period, program instructions to determine the at least one user of the one or more users is a preferred user.

14. The computer system of claim 13, further comprising:
program instructions to determine at least one of the one or more users is a preferred user, based on the one or more messages received from the at least one user; and
program instructions to send the one or more messages from the preferred user directly to the reservation system.

15. The computer system of claim 13, wherein the limiting component in the sending step further includes a second computer processor, wherein the second computer processor processes message traffic at a slower rate than the first computer processor.

16. The computer system of claim 13, wherein the received one or more messages include at least one of: a search request, an information request, or a reservation selection.

17. The computer system of claim 13, wherein program instructions to determine at least one of the users is not a preferred user further comprise:
program instructions to determine if a number of messages received and a type of message received exceeds a predetermined threshold; and
program instructions to determine, based on the exceeded predetermined threshold, the at least one of the one or more users is not a preferred user.

18. The computer system of claim 17, wherein the predetermined threshold is defined based, at least in part, on a plurality of rules set by an owner of the reservation system, and wherein the plurality of rules includes at least a time period in which a maximum number of the type of message is received.

* * * * *